US007128277B2

(12) United States Patent
Schaupp

(10) Patent No.: US 7,128,277 B2
(45) Date of Patent: Oct. 31, 2006

(54) POWDER BELL WITH SECONDARY CHARGING ELECTRODE

(75) Inventor: John F. Schaupp, Toledo, OH (US)

(73) Assignee: Illinois Tool Works Inc., Glenview, IL (US)

( * ) Notice: Subject to any disclaimer, the term of this patent is extended or adjusted under 35 U.S.C. 154(b) by 134 days.

(21) Appl. No.: 10/628,907

(22) Filed: Jul. 29, 2003

(65) Prior Publication Data

US 2005/0023369 A1 Feb. 3, 2005

(51) Int. Cl.
*A01G 23/10* (2006.01)

(52) U.S. Cl. .......................... 239/3; 239/224; 239/700; 239/703; 239/706

(58) Field of Classification Search .................... 239/3, 239/223, 224, 690, 699, 700, 703, 706, 707, 239/708; 118/620, 621, 624, 625, 626, 629
See application file for complete search history.

(56) References Cited

U.S. PATENT DOCUMENTS

| | | | |
|---|---|---|---|
| 2,759,763 | A | 8/1956 | Juvinall |
| 2,955,565 | A | 10/1960 | Schotland |
| 3,102,062 | A | 8/1963 | Graham et al. |
| 3,233,655 | A | 2/1966 | Graham |
| 3,536,514 | A | 10/1970 | La Fave et al. |
| 3,575,344 | A | 4/1971 | Angelico |
| 3,578,997 | A | 5/1971 | Felici |
| 3,589,607 | A | 6/1971 | Wolf et al. |
| 3,610,528 | A | 10/1971 | Felici |
| 3,684,174 | A | 8/1972 | Bein |
| 3,698,636 | A | 10/1972 | Szasz |
| 3,843,054 | A | 10/1974 | Kendall et al. |
| 3,913,523 | A | 10/1975 | Probst et al. |
| 3,964,683 | A | 6/1976 | Gimple |
| 4,037,561 | A | 7/1977 | LaFave et al. |
| 4,039,145 | A | 8/1977 | Felici et al. |
| 4,066,041 | A | 1/1978 | Buschor et al. |
| 4,114,564 | A | 9/1978 | Probst |
| 4,135,667 | A | 1/1979 | Benedek et al. |
| 4,169,560 | A | 10/1979 | Vohringer |
| 4,171,100 | A | 10/1979 | Benedek et al. |
| 4,214,708 | A | 7/1980 | Lacchia |
| 4,215,818 | A | 8/1980 | Hopkinson |
| 4,216,915 | A | 8/1980 | Hengartner et al. |
| 4,323,197 | A | 4/1982 | Morishita et al. |
| 4,350,304 | A | 9/1982 | Sugiyama et al. |
| 4,360,155 | A | 11/1982 | Hubbell et al. |
| 4,381,079 | A | 4/1983 | Allen |
| 4,402,991 | A | 9/1983 | Meisner |

(Continued)

FOREIGN PATENT DOCUMENTS

| | | |
|---|---|---|
| FR | 1274818 | 9/1991 |

(Continued)

OTHER PUBLICATIONS

Aerobell-Powder Applicator-ITW Automotive Dvision.

(Continued)

*Primary Examiner*—Steven J. Ganey
(74) *Attorney, Agent, or Firm*—Barnes & Thornburg LLP

(57) ABSTRACT

A method and apparatus for dispensing electrically charged particles of a coating material. A source provides the coating material to a coating material dispenser. An electrical supply supplies electrical charge. A first electrode provides charge to the coating material as it is dispensed. At least one second electrode is provided at a location removed from the first electrode. Both the first electrode and the at least one second electrode are coupled to the supply of electrical charge.

28 Claims, 4 Drawing Sheets

U.S. PATENT DOCUMENTS

| | | | | |
|---|---|---|---|---|
| 4,422,577 | A | 12/1983 | Arnold et al. | |
| 4,447,008 | A | 5/1984 | Allen | |
| 4,450,785 | A | 5/1984 | Meisner | |
| 4,505,430 | A | 3/1985 | Rodgers et al. | |
| RE31,867 | E | 4/1985 | Kennon | |
| 4,518,119 | A | 5/1985 | Vetter | |
| 4,520,754 | A | 6/1985 | Gange et al. | |
| 4,580,727 | A | 4/1986 | Moos | |
| 4,597,533 | A | 7/1986 | Shirai et al. | |
| 4,598,870 | A | 7/1986 | Schloz | |
| 4,685,620 | A | 8/1987 | Law et al. | |
| 4,726,521 | A | 2/1988 | Simm et al. | |
| 4,779,805 | A | 10/1988 | Jackson et al. | |
| 4,785,995 | A | 11/1988 | Yamane et al. | |
| 4,788,933 | A | 12/1988 | Buschor | |
| 4,798,340 | A | 1/1989 | Vohringer et al. | |
| 4,802,625 | A | 2/1989 | Buschor | |
| 4,825,807 | A | 5/1989 | Nakamura et al. | |
| 4,879,137 | A | 11/1989 | Behr et al. | |
| 4,890,190 | A | 12/1989 | Hemming | |
| 4,896,384 | A | 1/1990 | Dijkhuizen | |
| 4,921,172 | A | 5/1990 | Belmain et al. | |
| 5,353,995 | A | 10/1994 | Chabert | |
| 5,358,182 | A | 10/1994 | Cappeau et al. | |
| 5,433,387 | A | 7/1995 | Howe et al. | |
| 5,518,546 | A | 5/1996 | Williams et al. | |
| 5,584,931 | A * | 12/1996 | Buhlmann | 239/706 |
| 5,720,436 | A | 2/1998 | Buschor | |
| 5,749,529 | A * | 5/1998 | Kazama et al. | 239/690 |
| 5,853,126 | A | 12/1998 | Alexander | |
| 5,947,377 | A * | 9/1999 | Hansinger et al. | 239/3 |
| 6,230,993 | B1 * | 5/2001 | Austin et al. | 239/700 |
| 6,328,224 | B1 | 12/2001 | Alexander | |
| 6,793,150 | B1 * | 9/2004 | Schaupp et al. | 239/224 |

FOREIGN PATENT DOCUMENTS

| | | |
|---|---|---|
| FR | 2603210 | 4/1998 |
| GB | 1209653 | 10/1970 |
| GB | 2 297 504 A | 7/1996 |
| GB | 2 306 901 A | 5/1997 |
| JP | 58124560 | 7/1983 |
| JP | 60151554 | 8/1985 |
| JP | 62140669 | 6/1987 |
| JP | 63116776 | 5/1988 |
| JP | 01315361 | 12/1989 |
| JP | 03169361 | 7/1991 |
| JP | 03221166 | 9/1991 |
| JP | 06094166 | 4/1994 |
| JP | 07838493 | 12/1995 |
| JP | 10-057848 | 3/1998 |
| JP | 11-276937 | 10/1999 |

OTHER PUBLICATIONS

Aerobell & Aerobell Plus Rotary Atomizers, ITW Devilbiss Ransburg Industrial Liquid Systems.

* cited by examiner

POWDER BELL WITH SECONDARY CHARGING ELECTRODE

FIELD OF THE INVENTION

This invention relates to dispensers for dispensing coating materials such as liquid coating materials (hereinafter sometimes "paint") or pulverulent coating materials (hereinafter sometimes "coating powder" or "powder") suspended in gas streams, for example, a stream of air, from, for example, a fluidized powder bed. It is disclosed in the context of a rotary dispenser (hereinafter sometimes a "bell") for dispensing coating powder. However, it is believed to have utility in other applications as well.

BACKGROUND OF THE INVENTION

Systems for dispensing coating materials are known. There are, for example, the systems illustrated and described in U.S. Pat. Nos.: 3,536,514; 3,575,344; 3,698,636; 3,843,054; 3,913,523; 3,964,683; 4,037,561; 4,039,145; 4,114,564; 4,135,667; 4,169,560; 4,216,915; 4,360,155; 4,381,079; 4,447,008; 4,450,785; Re. 31,867; U.S. Pat. Nos. 4,520,754; 4,580,727; 4,598,870; 4,685,620; 4,788,933; 4,798,340; 4,802,625; 4,825,807; 4,921,172; 5,353,995; 5,358,182; 5,433,387; 5,720,436; 5,853,126; and, 6,328,224. There are also the devices illustrated and described in U.S. Pat. Nos.: 2,759,763; 2,955,565; 3,102,062; 3,233,655; 3,578,997; 3,589,607; 3,610,528; 3,684,174; 4,066,041; 4,171,100; 4,214,708; 4,215,818; 4,323,197; 4,350,304; 4,402,991; 4,422,577; Re. 31,590; U.S. Pat. Nos. 4,505,430; 4,518,119; 4,726,521; 4,779,805; 4,785,995; 4,879,137; 4,890,190; and, 4,896,384; British Patent Specification 1,209,653; Japanese published patent applications: 62-140,660; 1-315,361; 3-169,361; 3-221,166; 60-151,554; 60-94,166; 63-116,776; 58-124,560; and 331,823 of 1972; and, French patent 1,274,814. There are also the devices illustrated and described in "Aerobell™ Powder Applicator ITW Automatic Division," and, "Aerobell™ & Aerobell Plus™ Rotary Atomizer, DeVilbiss Ransburg Industrial Liquid Systems." The disclosures of these references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to an aspect of the invention, a method of dispensing electrically charged particles of a coating material includes providing a source of the coating material, providing a supply of electrical charge, and providing a dispenser for dispensing the charged particles of coating material. The method further includes providing on the dispenser a first electrode, coupling the source of coating material to the dispenser, providing at least one second electrode at a location removed from the first electrode, and coupling both the first electrode and the at least one second electrode to the supply of electrical charge.

Illustratively according to this aspect of the invention, providing a source of coating material and providing a dispenser include providing a fluidized bed in which the coating material is fluidized in a transporting medium and providing a dispenser for dispensing the coating material fluidized in the transporting medium.

Further illustratively according to this aspect of the invention, providing a dispenser includes providing a generally cup-shaped component having a perimetrally extending lip, providing a diffuser component having a perimetrally extending lip, and defining between the lips of the generally cup-shaped component and diffuser component a discharge region.

Additionally illustratively according to this aspect of the invention, providing a first electrode includes providing the first electrode on the diffuser component.

Illustratively according to this aspect of the invention, providing the diffuser component includes providing a diffuser component having a first side facing generally toward the generally cup-shaped component and a second side facing generally away from the cup-shaped component, and providing the first electrode includes providing the first electrode on the second side of the diffuser component.

Additionally illustratively according to this aspect of the invention, providing the first electrode includes providing a first electrode having a perimetral lip adjacent to the perimetrally extending lip of the diffuser component.

Further illustratively according to this aspect of the invention, the method includes providing a rotator for rotating the dispenser during dispensing of the coating material.

Further illustratively according to this aspect of the invention, the method includes mounting the diffuser component on the generally cup-shaped component and rotating the diffuser component as the generally cup-shaped component is rotated.

Illustratively according to this aspect of the invention, providing at least one second electrode includes providing multiple second electrodes and arraying the multiple second electrodes around an axis of rotation of the generally cup-shaped component and the diffuser component at a distance from the discharge region.

Additionally illustratively according to this aspect of the invention, providing multiple second electrodes comprises providing multiple needle-like second electrodes.

Further illustratively according to this aspect of the invention, the method comprises providing a rotator for rotating the dispenser during dispensing of the coating material and providing a housing for housing the rotator. The rotator has an output shaft for mounting the dispenser. The housing is provided with an opening through which the output shaft is accessible to mount the dispenser. Providing the at least one second electrode includes arraying multiple second electrodes around an axis of rotation of the dispenser. Coupling both the first electrode and the at least one second electrode to the supply of electrical charge includes coupling both the first electrode and the multiple second electrodes to the supply of electrical charge.

Illustratively according to this aspect of the invention, providing a dispenser includes providing a dispenser defining a discharge region from which the coating material is discharged. Providing multiple second electrodes includes arraying the multiple second electrodes around an axis of rotation of the dispenser at a first distance from the discharge region greater than a second distance from the discharge region to the first electrode.

Additionally illustratively according to this aspect of the invention, arraying the multiple second electrodes around an axis of rotation of the dispenser includes arraying the multiple second electrodes around an axis of rotation of the dispenser in a first direction from the discharge region opposite a second direction from the discharge region to the first electrode.

According to another aspect of the invention, an apparatus for dispensing electrically charged particles of a coating material includes a port through which coating material is introduced, a terminal through which electrical charge is introduced, a dispenser for dispensing the charged particles of coating material, a first electrode provided on the dispenser and at least one second electrode at a location removed from the first electrode. The port is coupled to the dispenser. Both the first electrode and the at least one second electrode being coupled to the terminal.

Illustratively according to this aspect of the invention, the apparatus further includes a source of coating material for coupling to the port.

Further illustratively according to this aspect of the invention, the source comprises a fluidized bed in which the coating material is fluidized in a transporting medium. The dispenser comprises a dispenser for dispensing the coating material fluidized in the transporting medium.

Additionally illustratively according to this aspect of the invention, the dispenser includes a generally cup-shaped component having a perimetrally extending lip, a diffuser component having a perimetrally extending lip, and a discharge region defined between the lips of the generally cup-shaped component and diffuser component.

Illustratively according to this aspect of the invention, the first electrode is provided on the diffuser component.

Further illustratively according to this aspect of the invention, the diffuser component includes a first side facing generally toward the generally cup-shaped component and a second side facing generally away from the cup-shaped component. The first electrode is provided on the second side of the diffuser component.

Additionally illustratively according to this aspect of the invention, the first electrode includes a perimetral lip adjacent to the perimetrally extending lip of the diffuser component.

Further illustratively according to this aspect of the invention, the apparatus includes a rotator for rotating the dispenser during dispensing of the coating material.

Illustratively according to this aspect of the invention, the diffuser component is mounted on the generally cup-shaped component.

Additionally illustratively according to this aspect of the invention, the at least one second electrode includes multiple second electrodes arrayed around an axis of rotation of the generally cup-shaped component and the diffuser component at a distance from the discharge region.

Illustratively according to this aspect of the invention, the multiple second electrodes comprise multiple needle-like second electrodes.

Further illustratively according to this aspect of the invention, the apparatus comprises a rotator for rotating the dispenser during dispensing of the coating material and a housing for housing the rotator. The rotator has an output shaft for mounting the dispenser. The housing includes an opening through which the output shaft is accessible to mount the dispenser. The at least one second electrode includes multiple second electrodes arrayed around an axis of rotation of the dispenser. Both the first electrode and the multiple second electrodes are coupled to the terminal.

Additionally illustratively according to this aspect of the invention, the dispenser defines a discharge region from which the coating material is discharged. The multiple second electrodes are arrayed around an axis of rotation of the dispenser at a first distance from the discharge region greater than a second distance from the discharge region to the first electrode.

Illustratively according to this aspect of the invention, the dispenser defines a discharge region from which the coating material is discharged. The multiple second electrodes are arrayed around an axis of rotation of the dispenser in a first direction from the discharge region opposite a second direction from the discharge region to the first electrode.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
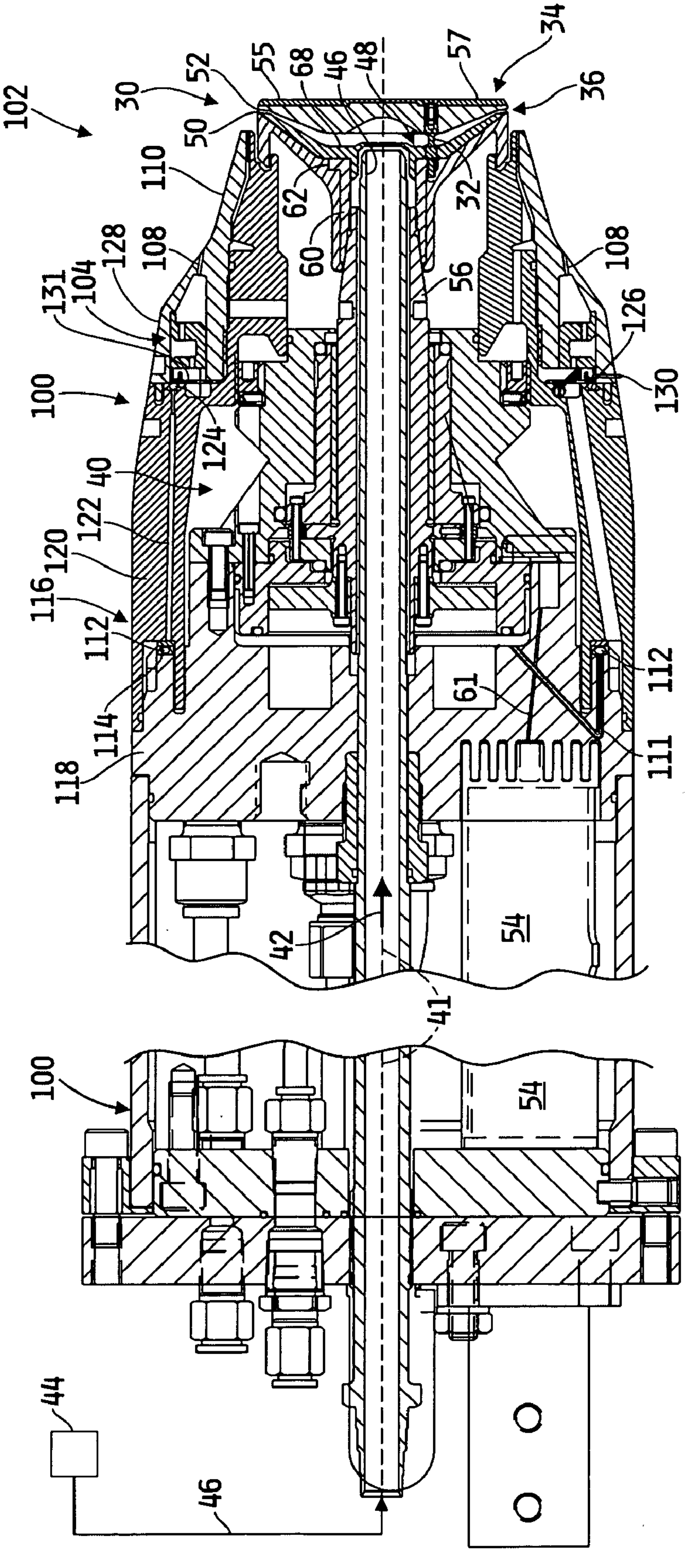
FIG. 1 illustrates a system constructed according to an aspect of the invention, with certain components of the system illustrated in fragmentary longitudinal sectional side elevational view, and other components of the system illustrated diagrammatically.
Figure 2:
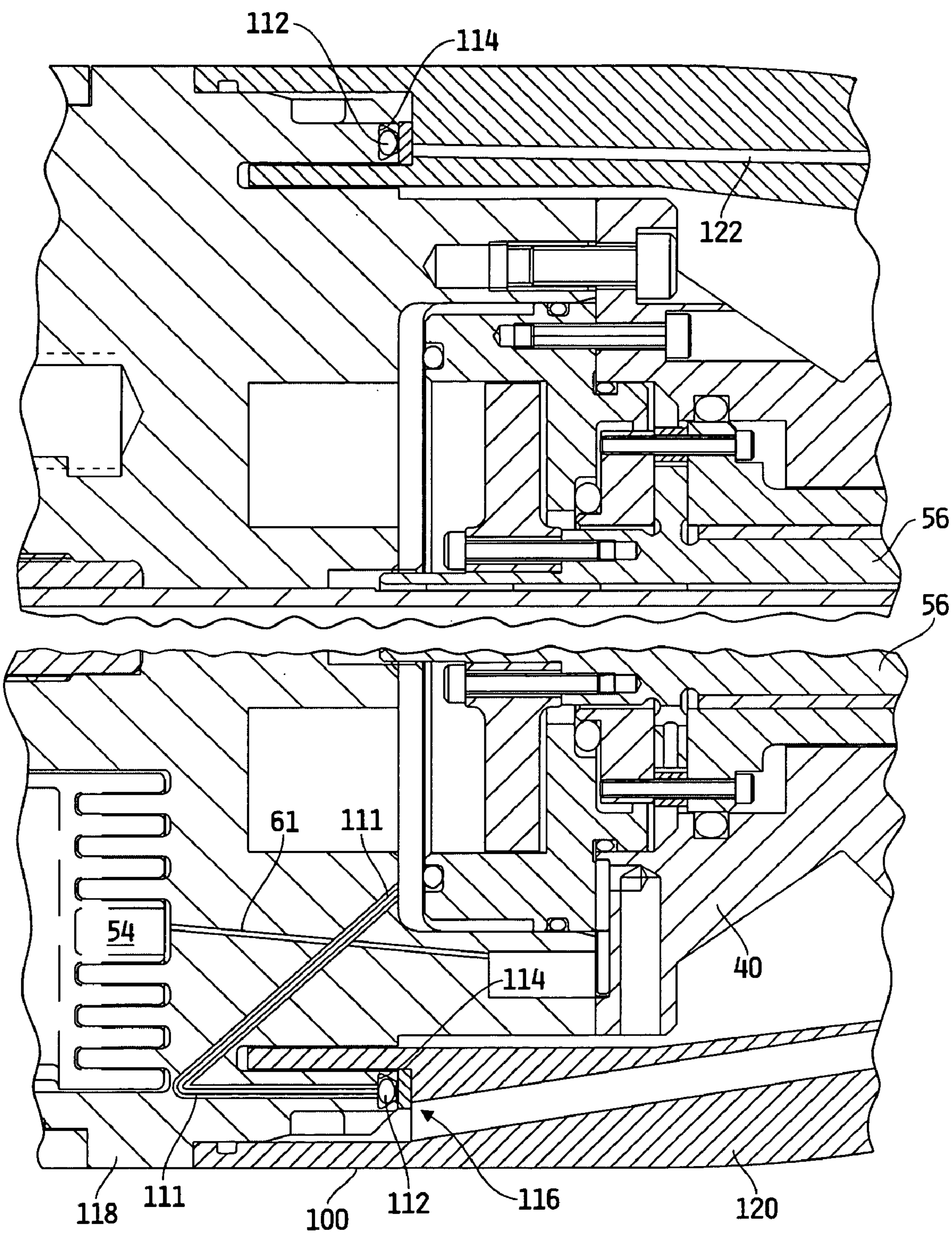
FIG. 2 illustrates a fragmentary, much enlarged detail of the system illustrated in FIG. 1.
Figure 3:
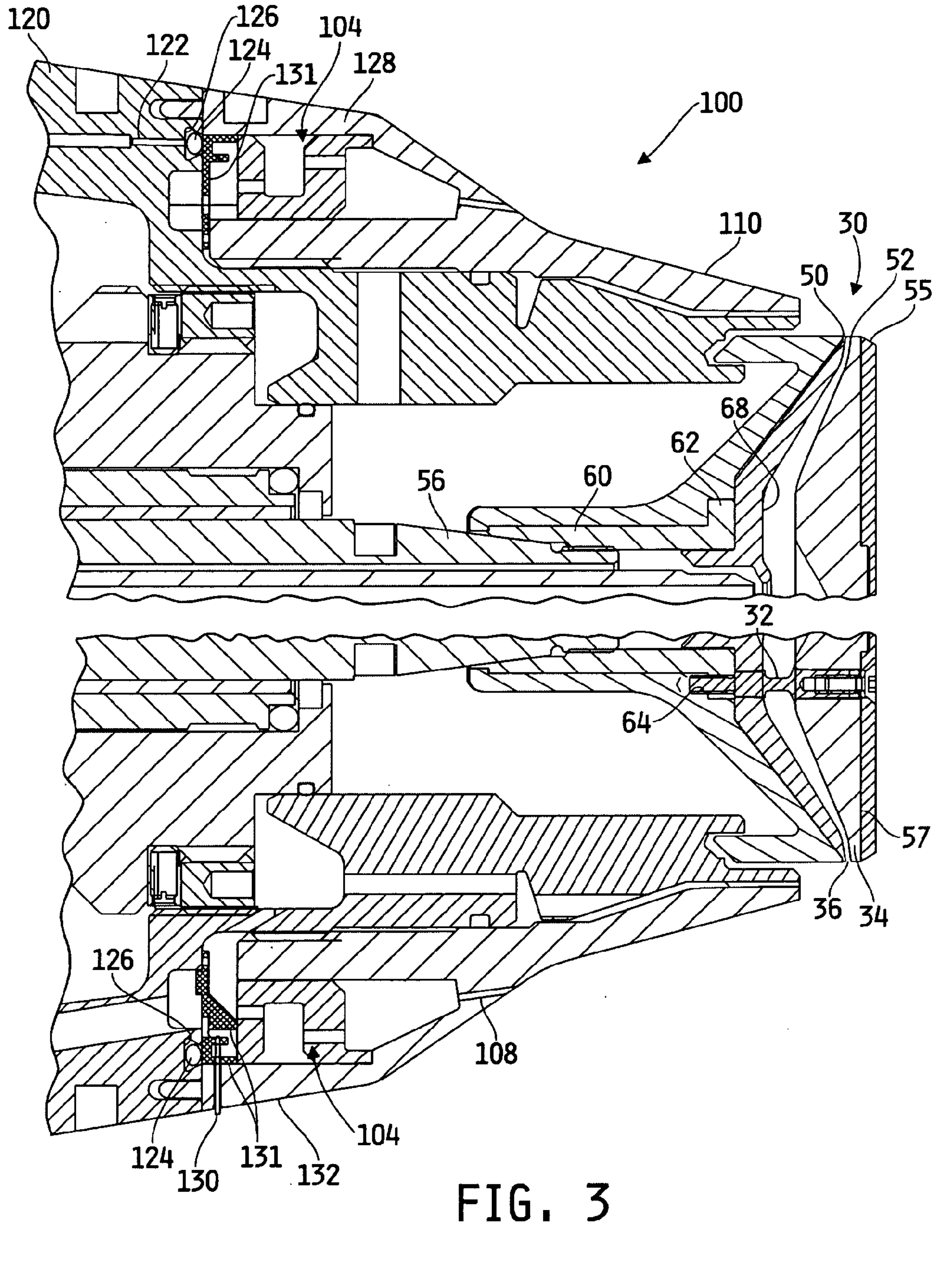
FIG. 3 illustrates a fragmentary, much enlarged detail of the system illustrated in FIG. 1; and, FIG. 4 illustrates a comparison of the system illustrated in FIGS. 1–3 operated under two different sets of conditions.

Referring to FIGS. 1–3, a powder bell cup 30 is mounted on a turbine 40 of any of a number of known types. Powder bell cup 30 may be, for example, one of the general type illustrated and described in U.S. Ser. No. 10/262,239 filed Sep. 30, 2002, titled Bell Cup Skirt, and assigned to the same assignee as this application. The disclosure of U.S. Ser. No. 10/262,239 is hereby incorporated herein by reference. Turbine 40 may be, for example, one of the general type illustrated and described in U.S. Pat. Nos. 5,853,126 and 6,328,224. Turbine 40 rotates the cup 30 about the cup 30's axis 41. Powder entrained in a stream 42 of a transporting gas, such as a stream of air, flows from a source 44, such as, for example, a fluidized bed containing the powder to be dispensed, through a conduit 46 to the back 48 of the bell cup 30. The source 44 may be one of any of a number of known types, for example, a fluidized bed of the general type illustrated and described in U.S. Pat. No. 5,768,800. The powder streams 42 from the conduit 46, through an opening 36 defined between the axially forward and radially outward extent, or edge, 50 of the bell cup 30 and the radially outward extent, or edge, 52 of a diffuser 34.

A high-magnitude potential source 54 is coupled to a final charging electrode 55 provided on the forward face 57 of the diffuser 34, that is, the face 57 facing generally toward an article 59 to be coated by the powder dispensed from the bell cup 30. The exposure of the streaming powder 42 to the charged electrode 55 results in charge being imparted upon the powder as the powder is being dispensed, with the result that the powder is attracted toward the article 59 which is maintained at low-magnitude, for example, ground, electrical potential. The article 59 is maintained at low-magnitude electrical potential by, for example, transporting the article 59 past the bell cup 30 on a grounded conveyor.

The high-magnitude electrostatic potential supply 54 can be of any of a number of known types, for example, one of the general type illustrated and described in U.S. Pat. Nos. 5,853,126 and 6,328,224. The power supply 54 is coupled through a high-magnitude potential conductor 61 and an electrically conductive component, for example, the metal housing, of the turbine 40 to, for example, the turbine 40's output shaft 56. Turbine 40's output shaft 56, in turn, is coupled to electrically conductive diffuser 34-mounting posts 32 through an electrically conductive component of the bell cup 30, such as its shaft 56-receiving sleeve 60. Sleeve 60 is provided with a flange 62 or the like including threaded openings 64 for receiving complementary threads on the posts 32.

During assembly, a cup 30 liner 68 of the general type described in U.S. Pat. Nos. 5,853,126 and 6,328,224 is inserted into the bell cup 30. A plurality of posts 32, illustratively three, are inserted through openings provided therefor in liner 68 and threaded into openings provided for posts 32 in flange 62. The posts may be of the general type illustrated and described in U.S. Ser. No. 10/236,486 filed Sep. 6, 2002, titled Bell Cup Post, and assigned to the same assignee as this application. The disclosure of U.S. Ser. No. 10/236,486 is hereby incorporated herein by reference. The forward ends of the posts 32 are provided with axial, threaded openings. The plate-like charging electrode 55 is located on the forward face 57 of the diffuser 34, and electrically conductive screws are threaded into the threaded openings in the forward ends of posts 32 to secure the diffuser 34 and electrode 55 to the bell cup 30 and electrically couple electrode 55 through posts 32, sleeve 60 and shaft 56 to supply 54. The posts 32 establish the width of the annular opening 36, support the diffuser 34 and the charging electrode 55 on the front of the diffuser 34, and provide a conductive path 61, 56, 60, 62, 32 from the high magnitude potential source 54 to the electrode 55, in order to charge the powder streaming through the annular opening 36.

The turbine 40 is housed within a shroud 100. Shroud 100 is provided at its forward end 102 with an annular gallery 104. Gallery 104 is provided with a compressed gas or mixture of gases, for example, compressed air, from a source such as so-called "factory compressed air," turbine 40 exhaust air, or some combination of these and/or other source. The forward end 102 of the shroud 100 adjacent gallery 104 is provided with a number of perimetrally spaced passageways 108 between gallery 104 and the surface 110 of forward end 102. The compressed gas streaming from gallery 104 through these passageways 108 helps to shape the cloud of powder streaming from annular opening 36 and propel the powder in the cloud toward the article 59.

Shroud 100 is also provided with a second high-magnitude potential conductor 111. Conductor 111 is coupled to conductor 61 intermediate supply 54 and the point at which conductor 61 makes contact with the turbine 40 housing. This coupling is achieved in the illustrated embodiment using a conductive adhesive, such as, for example, Meta-Duct 1202 silver adhesive and cement available from Mereco Technologies Group, 1505 Main Street, West Warwick, R.I. 02893. Conductor 111 extends first radially outwardly and rearwardly within shroud 100 and then forward to a point at which conductor 111 contacts a first electrically conductive, for example, silver/glass-filled, natural or synthetic resin, hollow O-ring 112. O-ring 112 is housed in a groove 114 provided therefor at a junction 116 of two adjacent components 118, 120 of shroud 100.

One end of a third high-magnitude potential conductor 122 provided in component 120 makes contact with O-ring 112 in the assembled shroud 100. Conductor 122 extends forward from O-ring 112 through a passageway provided for conductor 122 in component 120 to a second electrically conductive, for example, silver/glass-filled, natural or synthetic resin, hollow O-ring 124 housed in a groove 126 provided therefor at a junction 126 of two components 120, 128 of shroud 100. O-rings 112, 124 illustratively are constructed from filled resins having Shore A hardness in the range of about 45 to 75 durometer, specific gravity of about 1.8, tensile strength of about 200 p.s.i. (about 138 $Nt/cm^2$), an elongation of about 280%, a tear strength of 35 lb./in. (about 61 Nt/cm), and a volume resistivity of about 0.05 Ω-cm. O-rings 112, 124 are of types available from, for example, Zatkoff Seals & Packings, 23230 Industrial Park Drive, Farmington Hills, Mich. 48335-2850.

A plurality, illustratively fifteen, of equally angularly spaced, radially extending electrodes 130 extend between an electrically conductive, for example, bronze, electrode holder ring 131 mounted at junction 126 and a radially outer surface 132 of component 128. The radially inner ends of electrodes 130 are mounted in, and are therefore electrically connected to, ring 131. Ring 131 contacts O-ring 124 in the assembled shroud 100. This construction couples the high-magnitude potential provided by supply 54 not only to charging electrode 55 but also to electrodes 130, the radially outer ends of which are exposed at the surface 110 of shroud 100.

Figure 4:
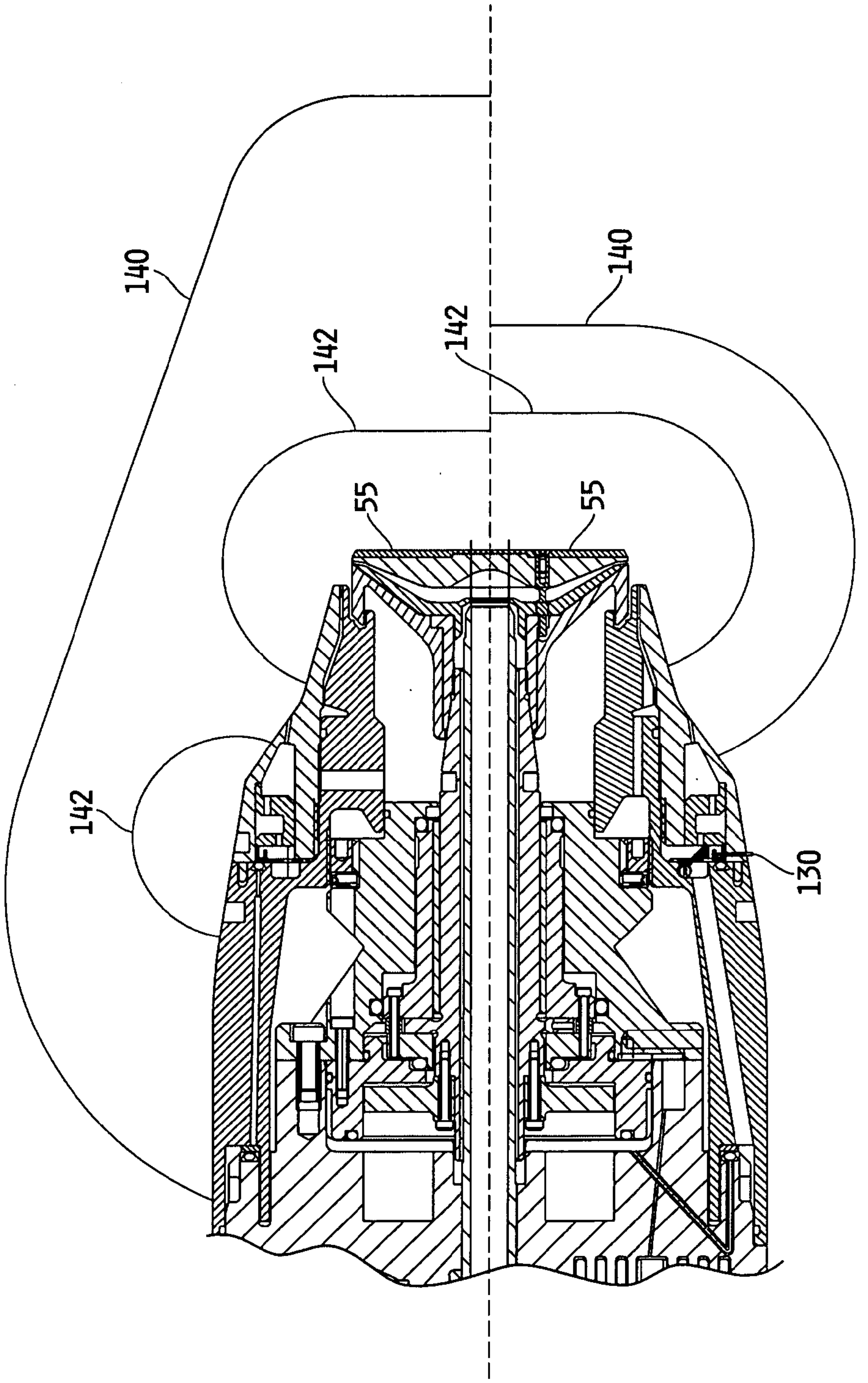

FIG. 4 illustrates a comparison of the electrical field provided by the illustrated system with −50 KV supplied to charging electrode 55 but with electrodes 130 maintained at ground potential (in the lower half of FIG. 4), and the illustrated system with −50 KV supplied both to charging electrode 55 and to electrodes 130 (in the upper half of FIG. 4). As can be appreciated by a careful study of this illustration, the −10 KV equipotential lines 140 and the −40 KV equipotential lines 142 extend much farther from charging electrode 55 both forward, that is, toward article 59 to be coated, and rearward, that is, away from article 59 and toward any supporting structure for turbine 40, powder bell cup 30 and shroud 100. This field configuration is believed to promote transport of more of the electrically charged powder dispensed from powder bell cup 30 toward article 59, and the deposit of less of the electrically charged powder dispensed from powder bell cup 30 on, for example, the rearward portion of shroud 100 and any supporting structure.

What is claimed is:

1. A method of dispensing electrically charged particles of a coating material toward an object to be coated thereby, the method including providing a source of the coating material, providing a supply of electrical charge, providing a dispenser including a generally cup-shaped component having a perimetrally extending lip, providing a diffuser component having a perimetrally extending lip, and defining between the lips of the generally cup-shaped component and diffuser component a discharge region for dispensing the charged particles of coating material, providing on the diffuser component a first electrode, the first electrode spaced a first distance from the object, coupling the source of coating material to the dispenser, providing multiple second electrodes and arraying the multiple second electrodes around the dispenser at a second distance from the object, the second distance being greater than the first distance, and coupling both the first electrode and the second electrodes to the supply of electrical charge.

2. The method of claim 1 wherein providing a source of coating material and providing a dispenser include providing a fluidized bed in which the coating material is fluidized in a transporting medium and providing a dispenser for dispensing the coating material fluidized in the transporting medium.

3. The method of claim 1 wherein providing the diffuser component includes providing a diffuser component having a first side facing generally toward the generally cup-shaped component and a second side facing generally away from the cup-shaped component, and providing the first electrode includes providing the first electrode on the second side of the diffuser component.

4. The method of claim 3 wherein providing the first electrode includes providing a first electrode having a perimetral lip adjacent to the perimetrally extending lip of the diffuser component.

5. The method of claim 4 further including providing a rotator for rotating the dispenser during dispensing of the coating material.

6. The method of claim 5 further including mounting the diffuser component on the generally cup-shaped component and rotating the diffuser component as the generally cup-shaped component is rotated.

7. The method of claim 6 wherein providing multiple second electrodes includes arraying the multiple second electrodes around an axis of rotation of the generally cup-shaped component and the diffuser component at a distance from the discharge region.

8. The method of claim 7 wherein providing multiple second electrodes comprises providing multiple needle-like second electrodes.

9. The method of claim 5 further including providing a housing for housing the rotator, providing the rotator including providing a rotator having an output shaft for mounting the dispenser, providing on the housing an opening through which the output shaft is accessible to mount the dispenser, providing multiple second electrodes including arraying the multiple second electrodes around an axis of rotation of the dispenser.

10. The method of claim 9 wherein arraying the multiple second electrodes around an axis of rotation of the dispenser includes arraying the multiple second electrodes around an axis of rotation of the generally cup-shaped component and the diffuser component in a second direction from the discharge region opposite a first direction from the discharge region to the first electrode.

11. The method of claim 5 further including providing a housing for housing the rotator, providing the rotator including providing a rotator having an output shaft for mounting the dispenser, providing on the housing an opening through which the output shaft is accessible to mount the dispenser, arraying the multiple second electrodes around an axis of rotation of the dispenser in a second direction from the discharge region opposite a first direction from the discharge region to the first electrode.

12. The method of claim 1 further comprising providing a rotator for rotating the dispenser during dispensing of the coating material, providing a housing for housing the rotator, the rotator having an output shaft for mounting the dispenser, providing on the housing an opening through which the output shaft is accessible to mount the dispenser, and arraying the multiple second electrodes around an axis of rotation of the dispenser.

13. The method of claim 12 wherein providing a dispenser includes providing a dispenser defining a discharge region from which the coating material is discharged, and providing multiple second electrodes includes arraying the multiple second electrodes around an axis of rotation of the dispenser at a second distance from the discharge region greater than a first distance from the discharge region to the first electrode.

14. The method of claim 13 wherein arraying the multiple second electrodes around an axis of rotation of the dispenser at a second distance from the discharge region greater than a first distance from the discharge region to the first electrode includes arraying the multiple second electrodes around an axis of rotation of the dispenser in a second direction from the discharge region opposite a first direction from the discharge region to the first electrode.

15. The method of claim 12 wherein arraying the multiple second electrodes around an axis of rotation of the dispenser includes arraying the multiple second electrodes around an axis of rotation of the dispenser in a second direction from the discharge region opposite a first direction from the discharge region to the first electrode.

16. Apparatus for dispensing electrically charged particles of a coating material toward an object to be coated thereby, the apparatus including a port through which coating material is introduced, a terminal through which electrical charge is introduced, a dispenser including a generally cup-shaped component having a perimetrally extending lip, a diffuser component having a perimetrally extending lip, and a discharge region defined between the lips of the generally cup-shaped component and diffuser component for dispensing the charged particles of coating material, a first electrode provided on the diffuser component, the first electrode proportioned to be spaced a first distance from such an object, the port being coupled to the dispenser, and multiple second electrodes arrayed around the dispenser and proportioned to be spaced at a second distance from such an object, the second distance being greater than the first distance, both the first electrode and the multiple second electrodes being coupled to the terminal.

17. The apparatus of claim 16 further including a source of coating material for coupling to the port.

18. The apparatus of claim 17 wherein the source comprises a fluidized bed in which the coating material is fluidized in a transporting medium and the dispenser comprises a dispenser for dispensing the coating material fluidized in the transporting medium.

19. The apparatus of claim 16 wherein the diffuser component includes a first side facing generally toward the generally cup-shaped component and a second side facing generally away from the cup-shaped component, the first electrode provided on the second side of the diffuser component.

20. The apparatus of claim 19 wherein the first electrode includes a perimetral lip adjacent to the perimetrally extending lip of the diffuser component.

21. The apparatus of claim 20 further including a rotator for rotating the dispenser during dispensing of the coating material.

22. The apparatus of claim 21 wherein the diffuser component is mounted on the generally cup-shaped component.

23. The apparatus of claim 22 wherein the at least one second electrode includes multiple second electrodes arrayed around an axis of rotation of the generally cup-shaped component and the diffuser component at a distance from the discharge region.

24. The apparatus of claim 23 wherein the multiple second electrodes comprise multiple needle-like second electrodes.

25. The apparatus of claim 16 further comprising a rotator for rotating the dispenser during dispensing of the coating material, a housing for housing the rotator, the rotator having an output shaft for mounting the dispenser, the housing including an opening through which the output shaft is accessible to mount the dispenser, the at least one second electrode including multiple second electrodes arrayed around an axis of rotation of the dispenser, both the first electrode and the multiple second electrodes being coupled to the terminal.

26. The apparatus of claim 25 wherein the dispenser defines a discharge region from which the coating material is discharged, the multiple second electrodes are arrayed around an axis of rotation of the dispenser at a first distance from the discharge region greater than a second distance from the discharge region to the first electrode.

27. The apparatus of claim 26 wherein the multiple second electrodes are arrayed around an axis of rotation of the dispenser in a first direction from the discharge region opposite a second direction from the discharge region to the first electrode.

28. The apparatus of claim 25 wherein the dispenser defines a discharge region from which the coating material is discharged, the multiple second electrodes arrayed around an axis of rotation of the dispenser in a first direction from the discharge region opposite a second direction from the discharge region to the first electrode.

* * * * *